Figure 1:
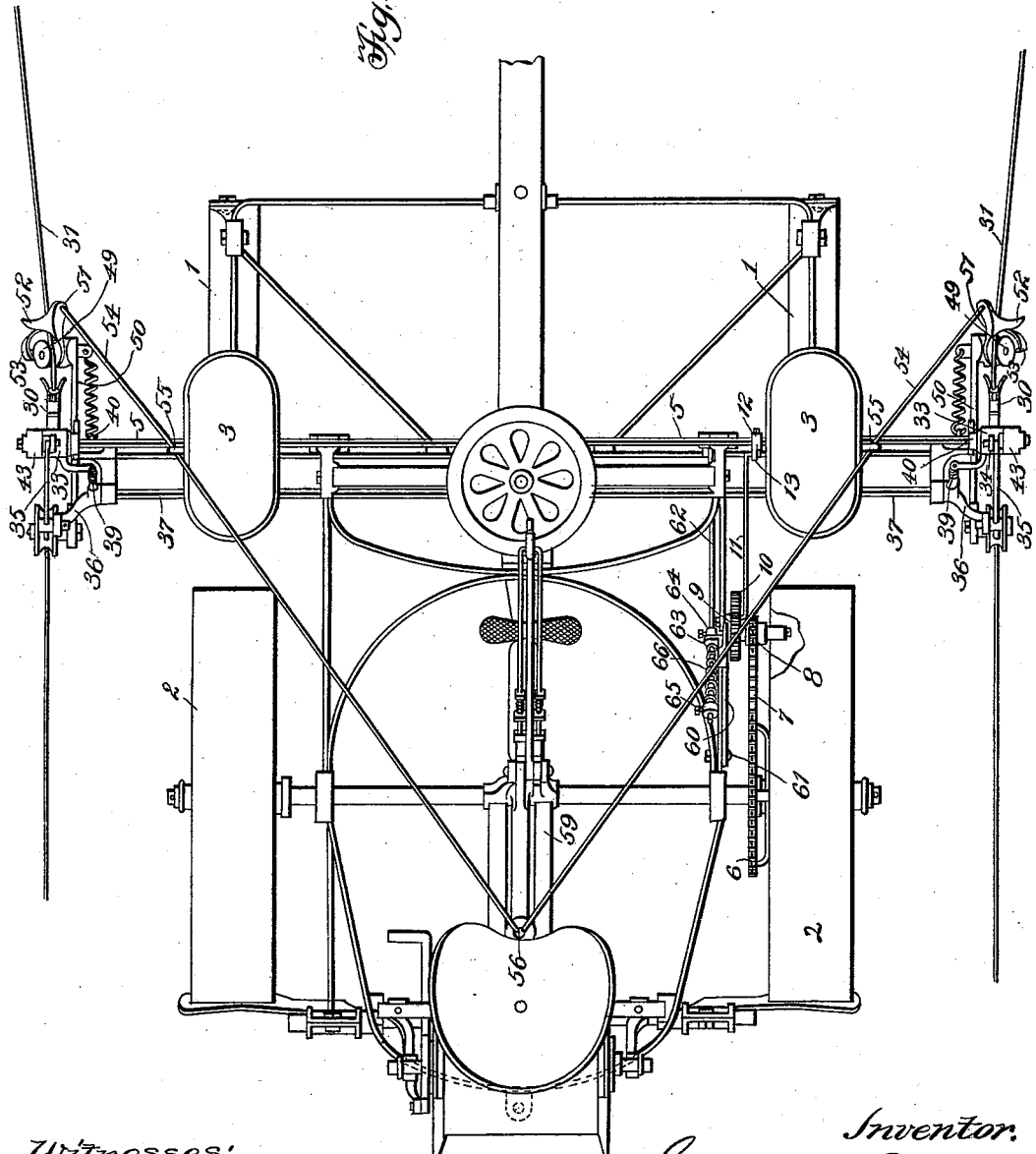

(No Model.) 4 Sheets—Sheet 1.

G. W. PACKER.
CORN PLANTER.

No. 525,359. Patented Sept. 4, 1894.

Witnesses:
Celo Bindum
C. B. Bull.

Inventor:
George W. Packer
By J. G. Manahan
his Attys.

(No Model.) 4 Sheets—Sheet 2.
G. W. PACKER.
CORN PLANTER.
No. 525,359. Patented Sept. 4, 1894.
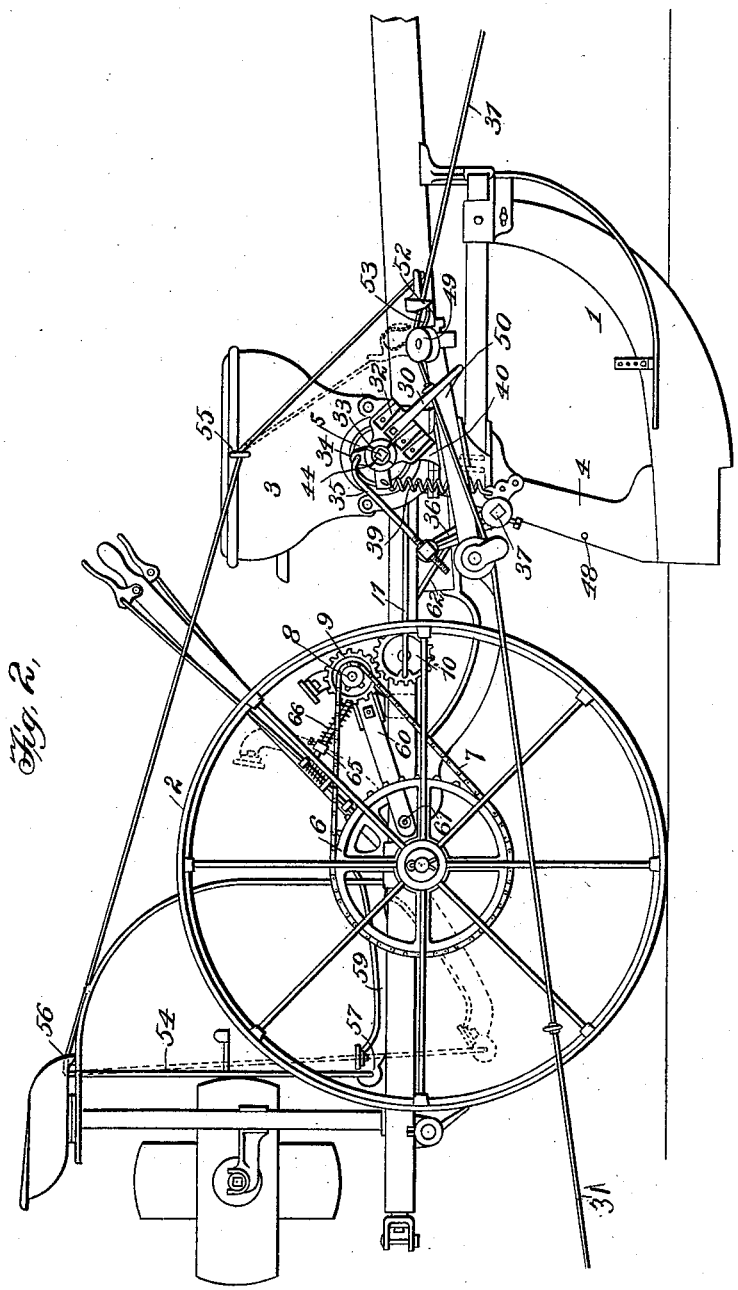
Witnesses:
Ull. Bindine
C. B. Bull.
Inventor:
George W. Packer
By J. G. Manahan
his Attys (No Model.) 4 Sheets—Sheet 3.
G. W. PACKER.
CORN PLANTER.
No. 525,359. Patented Sept. 4, 1894.
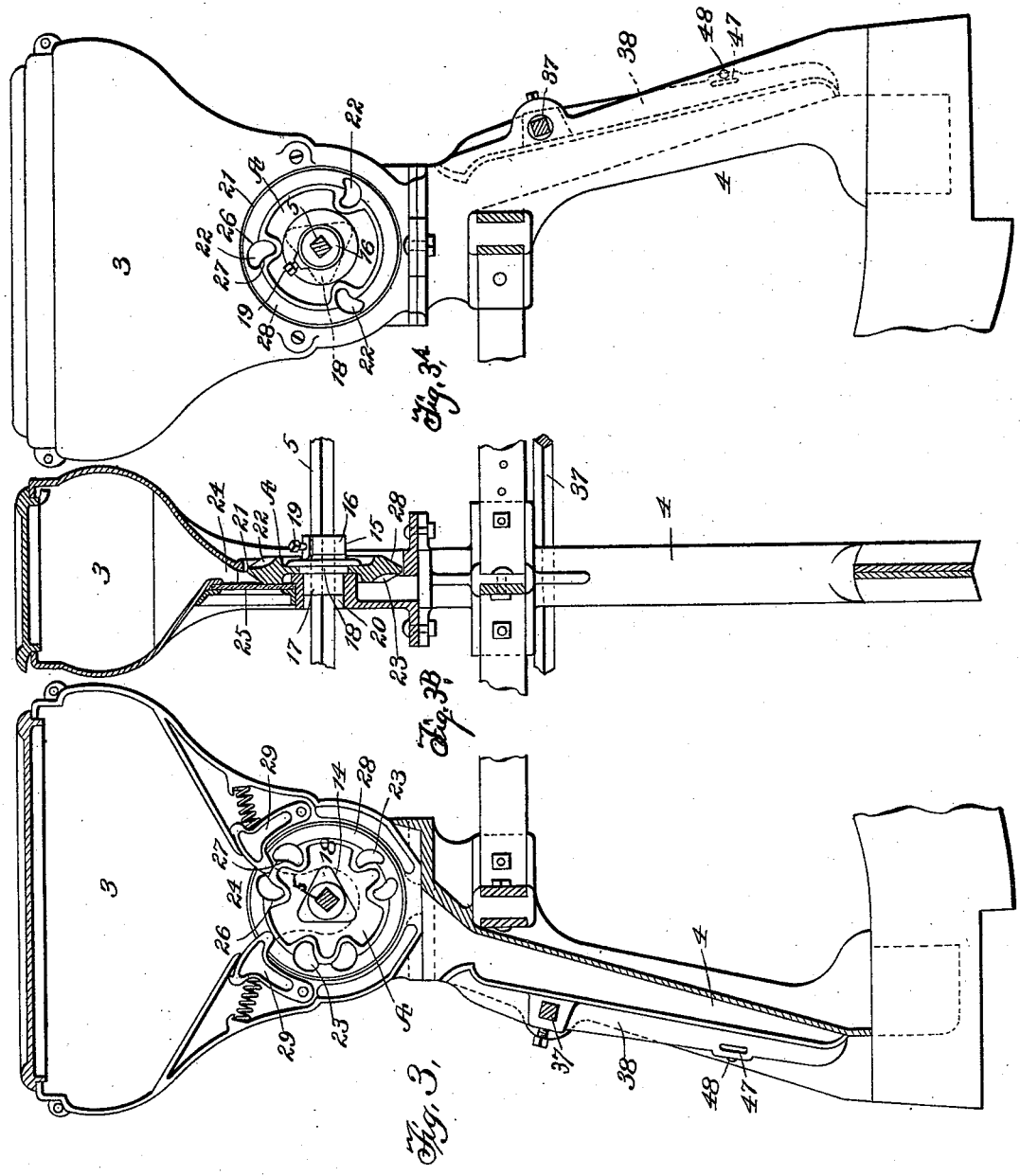
Witnesses:
Cle Binding
C. B. Bull.
Inventor.
George W. Packer
By J. G. Manahan.
his Attys.

(No Model.)　　　　　　　　　　　　　　　4 Sheets—Sheet 4.
G. W. PACKER.
CORN PLANTER.
No. 525,359.　　　　　　　　　　Patented Sept. 4, 1894.
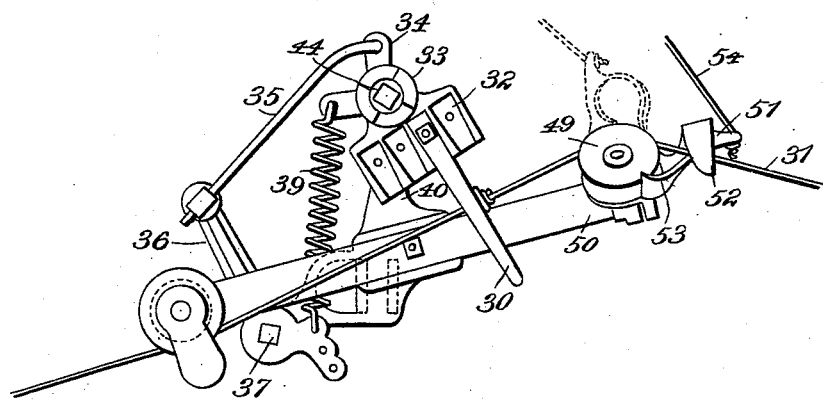
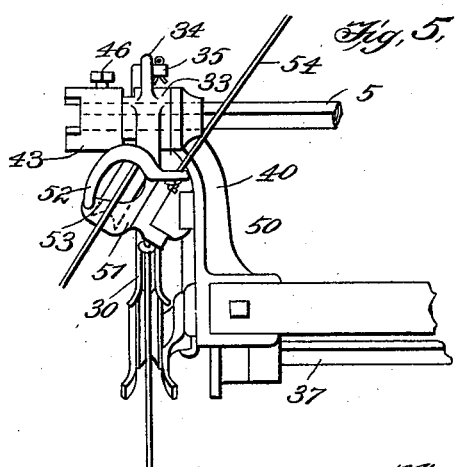
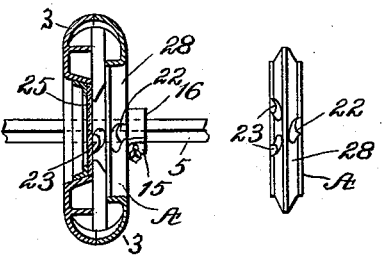
Witnesses:　　　　　　　　　　　　Inventor,
　　　　　　　　　　　　　　　　　George W. Packer
　　　　　　　　　　　　　　　　　By J. G. Manahan
　　　　　　　　　　　　　　　　　his Attys

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

CORN-PLANTER.

SPECIFICATION forming part of Letters Patent No. 525,359, dated September 4, 1894.

Application filed August 12, 1893. Serial No. 483,011. (No model.)

*To all whom it may concern:*

Be it known that I, GEORGE W. PACKER, a citizen of the United States, residing at Rock Falls, in the county of Whiteside and State of Illinois, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention has reference to improvements in corn planters, and comprises the several novel devices hereinafter more explicitly set forth. Such improvements pertain to a machine, which, with certain changes hereinafter described, is adapted to either deposit the seed in check rows, or to drill the same.

Different modes of planting have been heretofore and now are in use. One mode, usually employed where corn is raised for ensilage, is to drill, about one grain at a time, directly from the seed hopper, down the boot of the furrow opener, or runner, into the earth. Another mode is to drop from the seed hopper into the boot of said runner at one time, a sufficient number of grains for a hill, to retain said hill in said boot temporarily, and to discharge it therefrom, by a subsequent action, into the earth. This is the oldest and best mode of check rowing, and it is termed "checking into the boot and checking out of it." To meet the demand for a machine which should be adapted, with slight changes, for both drilling and check rowing, a later mode of check rowing has been adopted, which consists of drilling or dropping one grain at a time from the seed hopper into the boot until there is accumulated in the latter a sufficient number of grains to constitute a hill, and then dropping said hill from the boot into the earth, in check. In drilling, the action of the valve in the boot is suspended, and the grain dropped directly from the hopper to the earth. This mode is all right for drilling, as the action is continuous, but it is unsatisfactory for checking, in that the making up of the hill by measuring out of the hopper one grain at a time, by a series of small seed cells, no number of which has absolute coincidence with the space between the hills, will therefore not deposit, each time the same number of grains in the boot, while the machine passed over the intervals between the cross checks.

The advantage of my invention in this regard is, that I combine for optional use in one machine, means for drilling and means for dropping a whole hill at one time from the seed hopper into the boot, and, if desired, means for drilling into the boot, and checking therefrom. In other words I combine in one machine, drilling and purely and wholly check dropping.

Another advantage in my machine is—that I use a half circular cavity for a seed cup, which is not wide enough, between its straight and circular sides, to admit a grain crosswise, and the grains therefore align themselves with their longest diameter parallel with said straight side, and when the grains enter in such uniform position, the size of the seed cavity can be more certainly calculated and thus provide for any desired number of grains. Again I place and actuate my seed plate in a vertical plane, and give my seed cell an orbital movement up into the seed, thereby, in connection with the scoop form of said cell, compelling the filling of the latter. Again, in check rowing I use but one seed cell, of the size selected, thus avoiding any possible variance of size and shape.

In check rowing, it is very desirable that the hills be deposited truly in cross lines, or checks, and as such dropping is almost universally accomplished automatically by means of a knotted wire or cord, it has been found almost impracticable to attain precision in cross lines, because the engagement of the knot with said fork, was not always coincident with the passage of the lower end of the seed duct over the cross, or check row.

The actuating fork of the seed operating device, is pivotally seated over the seed exit in the boot of the seed runner. Heretofore said actuating fork has been projected from its pivotal seat, either vertically or horizontally. The rear of the runner frame, being carried on a hinged support, any variance in the size of the horses, or in the front of said frame, would throw the heel of the runner forward or backward of the pivotal seat of the actuating fork of the check rower, and where said fork was in a vertical position, such change would throw the fork in an opposite direction from said pivotal seat. Therefore, if the front end of the frame were raised, the heel of the runner would earlier reach the check, and the fork be later in reaching the button. If said front end were lowered, the variance would be reversed. Where said actuating fork projected horizontally, said difference was caused solely by the forward throw of the heel of the runner, and would be only half of the change resulting from the use of the vertical fork; but still enough to change the direction of the line of descent through the discharge heel. The same result occurred where the team passed over a rise in the ground, or a depression therein. To obviate these difficulties, I have projected the said actuating fork downward from its pivotal seat, in which position it partakes of, and accommodates itself to, the forward and backward oscillations aforesaid of the heel of the runner, so that if the heel of the runner be incidentally thrown forward or backward, said fork is also carried in the same direction, and actuated proportionately sooner, or later, as the case may be. In order to dispense with the usual adjusting mechanism between the actuating fork and the seed plate, and adjust the position of the fork to the speed of the team, I have provided a variance of seats for said fork on its own base, and placed said base directly upon the shaft which carries the seed plate, thereby insuring an immediate and direct actuating of the seed plate with each movement of said fork. I can therefore adjust the fork to the speed and height of the team, and normal height of the tongue, and the incidental variations of the latter are rendered harmless by the coincident oscillations of the seed runner and fork aforesaid, and no time, or motion is lost in transmitting the action of said fork to the seed plate.

Another difficulty heretofore, in throwing the actuating wire from the machine at the end of the row, has been that as the team would approach the end of the row it began to oblique laterally in preparation for the turn, and, therefore, was the more difficult to keep in the true line required. Coincident with this, the operator was required to make his preparations for throwing the said wire from the machine, and, therefore, his labor was complicated, and sometimes in giving his attention to the wire he had to neglect the team, or his attention was so concentrated upon the team that he neglected to throw the wire. In my invention I have devised mechanism by which the upward lifting of the runner frame on the wheel frame, an operation which is never neglected as it is essential to the turning of the machine, will, in itself, displace the said wire without any attention to the latter on the part of the driver.

I attain the foregoing advantages by the mechanism illustrated in the accompanying drawings, in which—

Figure 1 is a plan view of a machine embodying my invention, and exhibiting the relative position of the parts. Fig. 2 is a side elevation of the same. Figs. 3 and 3^A are two longitudinal vertical sections of the seed discharging mechanism, exhibiting the opposite sides of the vertical seed wheel or disk. Fig. 3^B is a cross section of said seeding devices, showing said seed cup in cross section. Fig. 4 is an end view of the check row operating mechanism. Fig. 5 is a front view of the same. Fig. 6 is a vertical cross section of the bottom of the seed hopper, showing the upper portion of the seed wheel in plan view. Fig. 7 is an edge view of the seed wheel, and Fig. 8 s a detail view of the actuating fork supporting mechanism, disconnected or separated.

Similar letters and figures refer to similar parts throughout the several views.

As the general formation of my machine, and many of its parts are the same as are in general use, and well known, I do not deem it necessary to specifically describe the entire machine, or any portion thereof other than what is necessary to afford an intelligible description of the construction, position, and mode of operation of my improvements.

The frame of my machine is preferably constructed of bar iron placed edgewise, as will be seen in Fig. 1, and consists of a front inner frame having two runners 1—1, and a rear wheel frame having two carrying wheels 2—2, with the usual flexible joint between said frames. The seed hoppers 3—3 are carried, as usual, upon the rear portion of the runners 1—1, and the seed from said hoppers is discharged into the earth through a suitable vertical boot 4 in the heels of said runners. A square shaft 5 is placed transversely of the machine under the seed hoppers, and extends a sufficient distance laterally beyond each to receive the seed wheel actuating devices. When the machine is used to drill either into the boot of the runner 1, or directly into the earth, said shaft 5 is oscillated by a sprocket wheel 6, on one of the carrying wheels 2, from which a sprocket chain 7 extends to and rotates a small sprocket wheel 8, integral with a pinion 9, which latter engages and rotates a lower pinion 10.

To the face of the pinion 10 there is removably attached a pitman 11, the forward end of which is attached to a sleeve 12, seated on shaft 5, and is pivotally connected to the sleeve 12 by means of a perforated lug 13 formed exteriorly on the under side of said sleeve, whereby the rotation of the carrying wheel 2 imparts a continuous oscillating movement to the shaft 5.

Referring to Figs. 3, 3^A, 3^B, and 6 A is the seed wheel or plate, in the center of which is formed the triangular transverse opening 14. The seed wheel hub 15, which carries said seed wheel, consists of the enlarged end 16, the reduced opposite end 17, and a triangular center 18, all integral. The hub 15 is seated on the shaft 5 by means of a set-screw 19 placed in the wall of said hub, and said hub is journaled and carried by its reduced end 17 being loosely fitted into the transverse sleeve 20 formed in the lower portion of the seed hopper 3, and the seed wheel A is carried on said hub by its triangular center 18 fitting into the triangular opening 14 of said seed wheel. The seed wheel A shown, simply oscillates with the shaft 5.

The wheel A is changeable so as to optionally use any hole, or holes, around its periphery, by loosening the hub 15 and withdrawing its triangular center 18 from opening 14, when the seed wheel A can be rotated on the shaft 5 so as to bring any desired size of seed cup to the upper side thereof, when the hub 15 is replaced. A portion of the center of the periphery 21 of the seed wheel A is formed flat in a true circle, while the residue of said periphery is sloped laterally toward the shaft 5. On one of the said sloping sides 28 is formed the seed cells 22, of various sizes, adapted to each receive and discharge a hill of corn, and being proportioned in capacity to the probable number of kernels required in such hill. Only the upper one of said seed cells 22 is used at a time, which, in the oscillations of the shaft 5, passes to and fro across one side of the opening 24 in the bottom of the seed hopper 3.

The opposite slope 28 of the seed plate A is provided with seed drilling cells 23, located in pairs, and adapted for measuring one grain, or kernel, each. In the use of this side of the wheel A, a pair of cells 23 is used at a time, each cell traversing a portion of the opening 24 in the seed hopper in opposite directions. Either side of the seed wheel A may be used by simply reversing said wheel on the shaft 5.

The operating side of the seed wheel A is fitted against a straight piece of glass 25, or other smooth vertical surface. All of the seed cells are, at their maximum depth, half circles in cross section, and are provided with an abrupt wall 26 at the rear side of their movement, and a sloping wall 27 at their front side. ("Front" and "rear" being used with reference to the direction the cell moves when loading.) The seed cells are also given a slight curvature forward at their upper ends, so that the forward movement of the seed wheel A, by reason of said curvature and the sloping front wall and abrupt rear wall of said seed cell and upward sweep of said cell tends to scoop or force the grain therein.

The half round formation of the seed cells permits the grains to pass therein only in a flat position; that is to say, with their greatest diameter in line with the seed plate, but not crosswise. This formation, together with the bevel 28 from the periphery 21 of the seed wheel to the seed cells, bearing against the vertical plane surface aforesaid, tends to throw all of the kernels resting on said bevel with their longest diameter in the same line with the seed wheel, and thus secures uniformity in the seed cells 23, which are intended to receive but one grain at a time, and corn of any size will so fill the cell at its center that there is no room anywhere in said cell for an additional grain; while in the cells 22, the passage of the corn therein in a flat position aforesaid, facilitated by the scoop-like movement of the cell, serves to fill said cells with grains arranged in the flat position aforesaid, and therefore secures a uniform number of grains in each hill.

In the oscillation of the shaft 5 in hill dropping, a selected cell 22 passes successively under one of the cut-offs 29, and in drilling, a pair of the cells 23 alternately pass in opposite directions under their respective cut-offs. With each movement of the shaft 5, whether in drilling or dropping, there is a slight jar, occasioned by the change of direction of the parts which assists in uniformly settling the grains within the seed cells. The mode of actuating the shaft 5, when drilling, has heretofore been described.

When the wheel A is used for dropping in hills, the pitman 11, aforesaid, is removed and the shaft 5 is rocked by means of a fork 30 seated on said shaft, and projected downwardly therefrom, and adapted to be actuated by the usual knotted wire 31. The fork 30 is adapted to be placed in any one of a series of seats 32 in its base 33, so as to move said fork forward or back adjustably to the speed of the team employed, as the faster the team walks the earlier the fork should be actuated, because in the swifter movement of the machine, less time is given between hills for the corn to pass out of the seed duct to the earth.

Integral with the fork base 33, and opposite to the fork 30, there is projected a short arm 34, in which is pivoted one end of the pitman 35, the other end of which is attached to the arm 36, seated on the lower transverse shaft 37 extended across the machine at the rear of the runner 1, and journaled at each end in the latter.

In the rear side of the vertical seed duct 4 formed in the rear of the runner 1, there is seated on shaft 37 the double actuating valve 38, adapted to alternately open and close the seed duct 4, at its respective ends.

The backward movement of the fork 30, draws the arm 36 forward, rocks the valve 38 backward at its lower end, thereby dropping to the earth the hill or bunch of corn theretofore retained at the lower end of said valve, and at the same time rocks the upper end of the valve 38 forward, and arrests the incoming hill or bunch of corn until said fork is released from the knotted wire 31, when the coiled spring 39, suitably attached to the fork base 33, returns said fork with said seed wheel to its original position, and by rocking shaft 37 in the opposite direction it disengages the upper end of valve 38, and engages the lower end of said valve with the seed duct 4, thereby arresting, at the lower end of said valve, the bunch of corn just previously released at the upper end of the latter.

The operating side of the seed plate A, except where interrupted by the cut-offs 29, communicates directly with the upper end of the seed duct 4, and the forward curve of the upper end of the seed cells, when the movement of said cells, after passing under said cut-offs, is suddenly arrested, has the effect of certainly throwing out their contents without any additional provision.

When it is desired to drill into the seed duct 4, and check only from the bottom of the latter, the action of fork 30 on shaft 5 is suspended in the following manner:—The shaft 5 is supported at each end in a round transverse hole 58 in post 40, seated on the frame of the machine, in which hole 58 shaft 5 oscillates. (See Fig. 8.) A round collar 41 is formed on the side of the post 40 around the shaft 5 as a seat for the base 33 of the fork 30. On one side of the base 33 there is formed a clutch 42, and there is provided a cap 43 adapted to be seated on the end of the shaft 5 outside of the base 33. The cap 43 has a square opening 44 to receive shaft 5, so that the movement of said cap and shaft is coincident. On one end of the cap 43 there is formed a clutch 45, and when it is desired that the oscillations of the fork 30 shall be communicated to the shaft 5, said cap is seated on shaft 5 with its clutch 45 engaging the clutch 42 of fork 30, whereby said fork is locked to said shaft, and its oscillations communicated to the latter. But when it is desired that said fork shall oscillate only the valve 38, the cap 43 is seated on shaft 5 with its smooth end next the clutch 42 of said fork, when the said fork will rotate on collar 41 without affecting, or being affected by, the shaft 5. The cap 43 is held in place by means of a set-screw 46 seated in its wall. When it is desired to use the machine for drilling, the wire 31 is not used, and the lower end of the valve 38 is drawn sufficiently backward and held by a cotter pin inserted in the opening 47 therein, and in a corresponding opening 48 in the wall of the seed duct 4, when the seed is discharged down said duct without interruption, and the seed plate A operated entirely through the medium of the pitman 11, aforesaid.

The actuating wire 31 is drawn from its supporting sheave 49 by the following mechanism:—Said sheave is pivotally seated on the forward end of the bar 50 attached to the machine, and on the same pivot is pivoted the rocking arm 51, provided with the overhanging lip 52 to retain said wire in place, and the under-lying lip 53 beneath said wire, and having an inclined upper surface. A cord 54 is attached to the outer end of the arm 51, and from thence passed through a perforated lug 55, formed on the exterior of the seed hopper 3, and thence through a suitable opening 56 in the driver's seat, and from there downward, and attached to the rear end 57 of the usual lifting foot lever 59 fulcrumed on the rear frame of the machine, as illustrated in Fig. 2, and when the rear end of said lever is forced downward in the usual way, it draws downward on the cord 54, and causes the upper inclined surface of the lip 53 to raise the cord 31 from sheave 49, and drop said cord outside of the machine. Heretofore, in drilling, the operator would sometimes forget to throw the seeding devices out of gear at the end, and waste the seed in turning; sometimes he neglected throwing them in gear after turning, and would fail to drop seed for some time. To obviate this, I make the essential and never omitted raising of the front frame in turning, to, in itself, automatically throw the seeding devices out of gear, and the dropping of said frame to thrown said devices into gear as follows: The united pinions 8 and 9, are seated on the front end of a bar 60, the rear end of which is suitably pivoted at 61, on the rear frame of the machine, and projected diagonally upward and forward from said pivotal seat. A rod 62 is pivotally attached at its front end to the rear of the frame of the runners 1 near the top of said frame, and projected diagonally backward and upward loosely through a perforated ear 63, formed on the upper end of the bar 60, oppositely to said pinions. An adjustable collar 64 is seated on the rod 62 far enough below 63 that the ordinary oscillations of said runner will not cause the collar to strike said ear, but near enough that when said runner is raised, to turn the machine; collar 64 will engage ear 63, and by oscillating bar 60 backward, hold pinion 9 out of mesh with pinion 10 until the descent of the runner withdraws collar 64 from ear 63, and permits pinion 9 to fall into engagement again with pinion 10. To further insure such engagement, and also to hold said pinions in mesh, a collar 65 is adjustably seated at the rear end of rod 62 and behind ear 63, and between collar 65, and said ear, a compressed coiled spring 66 is placed on said rod. The spring 66 can be omitted if bar 60 is heavy enough.

What I claim as my invention, and desire to secure by Letters Patent of the United States, is—

1. In a corn planter, a seed hopper, an oscillating seed wheel or disk vertically arranged, provided with peripheral seed cells upon opposite sides of its central vertical plane, a boot below the seed wheel, said seed wheel being adjustable on its shaft to bring one or another set of cells in coincidence with the boot and means for oscillating said wheel; substantially as described.

2. A seed wheel or disk for a corn planter having peripheral oblique seed cells each forming at its maximum depth a half circle in cross section, and provided with an abrupt wall 26 at the rear side of their movement, and a sloping wall 27 at their front side, whereby in the upward movement of the wheel, the cells act to force or scoop the grain into the cells only in flat position, substantially as described.

3. The herein described improvement for corn planters comprising a seed wheel or disk having cells of various sizes to accommodate different sizes of kernels; and means for adjusting said wheel or disk on its shaft to bring any desired cell into operation substantially as described.

4. In combination with the oscillating shaft, the seed-wheel mounted thereon, provided with cells of various sizes, and having its cells located upon opposite sides of its central vertical plane and means for adjusting the wheel on the shaft to bring any set of cells into use; and for reversing its position on said shaft substantially as described.

5. In combination with the oscillating shaft, the hub 15, the vertically arranged seed wheel or disk mounted thereon and provided with cells of various sizes, said hub being removably and adjustably secured to the shaft whereby the position of the seed wheel or disk may be changed to bring a new series of cells into play; substantially as described.

6. The combination of a seed wheel or disk having peripheral seed cells of various sizes, an angular seat 14, the shaft 5, the hub 15 removably seated on said shaft and provided with the bearing 17, the angular center 18, adapted to enter said seat 14, and the sleeve 20 adapted to receive the bearing 17 substantially as described.

7. In a corn planter, the combination of a runner or furrow opener pivotally seated at or near its rear upper corner on the frame of the machine, a seed operating fork seated at or near the same pivotal point and projected downwardly therefrom and adapted to be operated by the usual check-row wire or rope whereby the casual oscillations forward and back of said seed runner and fork are coincident and in the same direction; substantially as and for the purpose described.

8. In a corn planter, the combination with a downwardly projecting operating fork 30, a sheave 49 in front of the fork, a rocking arm pivoted to the frame of the machine and provided with a lip 53, said lip having an inclined upper surface, one end of which projects above the upper surface of the sheave, and a cord 54 connected with the arm 51 at one end and with the rear end of the foot lever at the other end, whereby when the foot lever is depressed the arm is swung upon its pivot and the inclined portion of the lip is caused to engage with the knotted actuating wire and lift it from the sheave, and let it drop out of the fork, substantially as set forth.

9. In a corn planter, the combination of a transverse, oscillating shaft 5, seed wheel A seated thereon in a vertical plane and provided on its side near its periphery with curved seed cells having an abrupt rear wall 26 and a sloping front side 27 and the cut-off 29, the curvature of said cells being in the direction of the movement when loading, and means substantially as shown for oscillating said shaft combined and operated for the purpose specified.

10. The combination with the fork 30, of the fork bar 33, having a series of seats 32, and means for securing said fork in any one of the seats; substantially as described.

11. In a two row corn planter, the seed wheel, the pinion 10, connections between the two, a bar 60, pivotally seated on the rear frame, and provided with perforated ear 63 on its free end, a rod 62 pivotally seated on the front frame, and having the engaging collar 64 and projecting through said ear, and a pinion 9, seated on the bar and adapted to engage the pinion 10, substantially as described.

12. In a two row corn planter, the oblique bar 60, pivoted on the rear frame and having the perforated ear 63, rod 62, pivotally seated on the front frame and projected backward through said ear and provided with collars 64 and 65, spring 66 seated on the rod 62, between the ear 63, and collar 65, the pinion 9 seated on the free end of bar 60, and adapted to engage the pinion 10 with means for driving the pinion 9 substantially as described.

13. In a two row corn planter the combination of a bar pivoted at one end on the rear frame, a driving pinion seated on the free end of said bar and adapted to optionally engage a secondary driving pinion, and a rod pivotally seated on the front frame and adapted to raise said bar and disengage said first named pinion when said front frame is raised, and to permit the reengagement of said pinion when the front frame is lowered; substantially as described.

14. The combination of post 40 provided with opening 58 a collar 41, the angular seed wheel shaft 5, supported in said opening, the fork base 33, seated on said collar and provided with the clutch 42, and the reversible cap 43, having clutch 45, and angular opening 44, adapted to receive said shaft; substantially as described.

15. In a corn planter, a vertical seed wheel provided with oblique cells 23, arranged in pairs sloping toward each other, and means for oscillating said seed wheel, whereby said cells in the movement of the wheel traverse a portion of the opening in the seed hopper in opposite directions, one to the other; substantially as described.

In testimony whereof I affix my signature in presence of two witnesses.

GEORGE W. PACKER.

Witnesses:
JOHN G. MANAHAN,
M. ISABEL MANAHAN.